(12) United States Patent
Nasr

(10) Patent No.: US 12,480,818 B2
(45) Date of Patent: Nov. 25, 2025

(54) AXIAL DETECTORS, A NOVEL METHOD FOR THE DETECTION OF ELECTROMAGNETIC RADIATION AT A BROAD RANGE OF WAVELENGTHS

(71) Applicant: Magued Boshra Nasr, Newton, MA (US)

(72) Inventor: Magued Boshra Nasr, Newton, MA (US)

( * ) Notice: Subject to any disclaimer, the term of this patent is extended or adjusted under 35 U.S.C. 154(b) by 203 days.

(21) Appl. No.: 18/514,143

(22) Filed: Nov. 20, 2023

(65) Prior Publication Data

US 2025/0164316 A1     May 22, 2025

(51) Int. Cl.
*G01J 5/20*     (2006.01)
*G01J 5/00*     (2022.01)

(52) U.S. Cl.
CPC ......... *G01J 5/20* (2013.01); *G01J 2005/0077* (2013.01); *G01J 2005/202* (2013.01)

(58) Field of Classification Search
None
See application file for complete search history.

(56) References Cited

U.S. PATENT DOCUMENTS 10,468,781 B1 * 11/2019 Paulsen ............... H01Q 3/26
11,222,987 B2 *  1/2022 Heck .................. G02B 1/002
11,296,240 B1 *  4/2022 Davids ................ H10F 10/14
2014/0247043 A1 *  9/2014 Klein .................. G01R 33/07
                                                             324/251
2018/0076376 A1 *  3/2018 Brady ................. H01Q 1/48

FOREIGN PATENT DOCUMENTS

CN        112130231 A  * 12/2020   ............... G02B 5/30
WO     WO-2018021973 A2 *  2/2018 ............... H01P 7/00

OTHER PUBLICATIONS

Hall, D., G., "Vector-beam solutions of Maxwell's wave equation," Optics Letters, vol. 21, No. 1, pp. 9-11 (Jan. 1, 1996).
Kruk, S., et al., "Invited Article: Broadband highly efficient dielectric metadevices for polarization control," APL Photonics 1, vol. 030801, pp. 1-9 with cover page (10 total pages) published online Jun. 6, 2016.

* cited by examiner

*Primary Examiner* — Marcus H Taningco
(74) *Attorney, Agent, or Firm* — Wilmer Cutler Pickering Hale and Dorr LLP

(57) ABSTRACT

An electromagnetic radiation detector according to the present invention comprises a polarization control element (PCE) configured to receive incident radiation and having a substrate with a shape to polarize said incident radiation into a cylindrical vector beam (CVB), and a rectifying element (RE) configured to receive the CVB and generate a signal representing information of the incident radiation. The RE may include at least one toroid pair having a high conductivity toroid and a low conductivity toroid concentric with the high conductivity toroid, where each toroid pair, in response to receiving the CVB, creates a Hall voltage used to generate said signal representing information of the incident radiation.

20 Claims, 19 Drawing Sheets

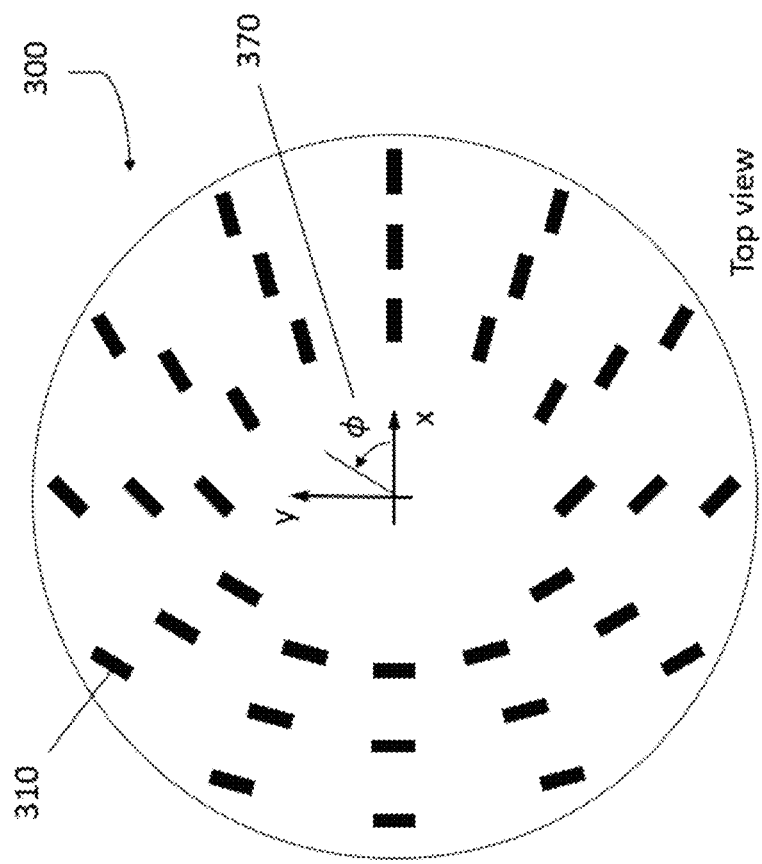
FIG. 3C
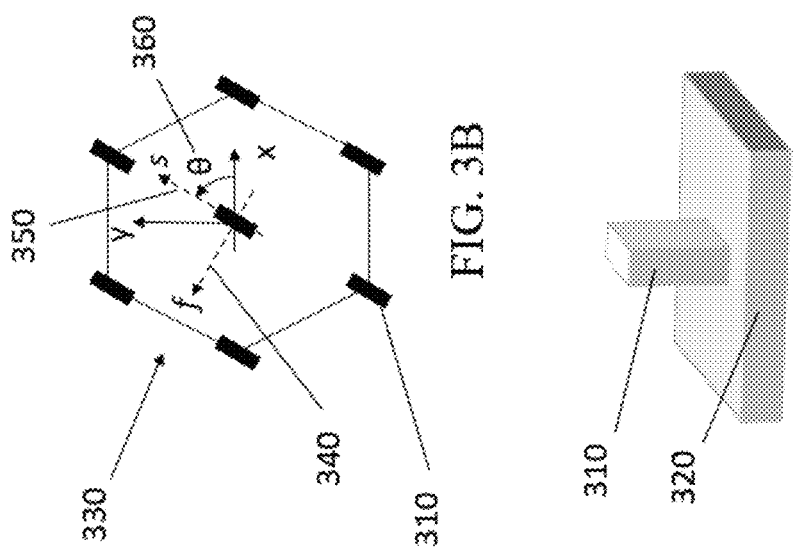
FIG. 3B
FIG. 3A

AXIAL DETECTORS, A NOVEL METHOD FOR THE DETECTION OF ELECTROMAGNETIC RADIATION AT A BROAD RANGE OF WAVELENGTHS

CROSS-REFERENCE TO RELATED APPLICATIONS

Field of the Invention

The present invention relates to a novel system and method to detect electromagnetic radiations employing a novel axial detector (AD) that generates a zero-frequency (DC) voltage at its output terminals when electromagnetic radiation such as that in the infrared (IR) range impinges upon it. The wavelength range whereat this novel detection method is applicable is broad and covers the giga Hertz (GHz), tera-Hertz (THz), infrared (IR) and visible (vis) ranges of the electromagnetic spectrum.

BACKGROUND

The detection of electromagnetic (EM) waves, e.g., those that occur naturally such as the visible and infrared (IR) radiation or those that are artificially generated such as the GHz and THz radio-frequency (RF) waves, has become an integral part of our daily life. At its heart, an EM detector makes use of a physical phenomenon to generate a DC signal in response to the incoming high-frequency radiation such as visible light. For example, the ubiquitous imaging chips that exist in all modern cellular phones, use the photoelectric effect to convert the visible light from individual pixels into a DC voltage that is measured and digitized to produce a digital image.

For imaging in the IR range, the commercially available detectors generally fall under one of two categories.
1. Detectors that rely on the photoelectric effect whereby the incident radiation excites free electrical carriers that are collected by the external electronic circuit.
2. Detectors that make use of microbolometers. In a microbolometer the incident IR radiation causes a change in the resistivity of a thin sensing film made of materials such as vanadium oxide or amorphous silicon.

IR detectors that rely on the photoelectric effect can operate at high speeds and when used in an array format (imaging chip) they can generate high-frame-rate videos on the order of 500 to 1000 frames per second (fps). However, fast IR imaging chips require strong cooling that may, in some cases, be a cryogenic cooling. Such cooling requirements are undesirable because they increase the cost to manufacture and use the IR detectors. The introduction of cooling devices also adds complexity to the detector systems.

Examples of IR detectors that rely on the photoelectric effect include:
1. Quantum well infrared photodetectors (QWIP) that are based on one or more of the following semiconductor alloys (InP, InGaAs, InGaAl, InSb).
2. Photodetectors that make use of the ternary alloy HgCdTe that comprises the three elements mercury (Hg), cadmium (Cd) and tellurium (Te) and are commonly known as MCT detectors.

IR imaging chips that rely on the technology of microbolometers do not require excessive cooling. However, they can only generate low-frame-rate videos (30 to 60 fps) and moreover, require a current flow through the individual sensing elements to measure the change in resistivity that the impinging IR radiation induces which increases their power consumption.

In 1996 D. G. Hall published a paper in which he described cylindrical vector beams (CVBs) whose electric field can be polarized along the azimuthal ($\phi$) or radial ($\rho$) directions and are solutions to the vector Helmholtz equation in cylindrical coordinates (Hall, 1996). See, e.g., Hall, D. G., *Vector-beam solutions of Maxwell's wave equation*, Optics letters, Vol. 21, Issue 1, 9, 9-11 (1996). Unlike the spatially uniform linear and circular states of polarization, CVBs have a non-uniform spatial distribution of the electric field that is centered about their axis of propagation.

For visualization, the amplitude and direction of the electric field at a fixed time and observation plane for (a) a linearly polarized wave and (b) an azimuthal CVB are depicted in FIGS. 1A and 1B. As shown in FIG. 1A, for a spatially-homogeneous linearly-polarized wave, the magnitude and direction of the electric field ($\vec{E}_{LP}$) 110 are independent of the observation point. As time evolves, its magnitude oscillates sinusoidally at an angular frequency $\omega$ parallel to a fixed line 120 such that the tip of $\vec{E}_{LP}$ changes its direction as illustrated by the thick double-tipped arrow 130. In contrast, as shown in FIG. 1B, for the spatially-non-uniform azimuthally-polarized CVB that is propagating about the axis 140, the direction of the electric field ($\vec{E}_{azm}$) 150, pointing in the direction of the azimuthal angle $\phi$ 160, changes at different Cartesian (x, y) coordinates within the observation plane. As time evolves, the magnitude of the electric field vector $\vec{E}_{azm}$ oscillates sinusoidally at an angular frequency $\omega$ such that it points in a clockwise direction during one half of the oscillation period and in a counter-clockwise direction for the other half of the period, as illustrated by the thick double-sided arrow 170.

SUMMARY

The preferred embodiments of the invention are directed at improved electromagnetic radiation detectors. In some embodiments, an electromagnetic radiation detector may comprise a polarization control element (PCE) configured to receive incident radiation and having a substrate with a shape to polarize said incident radiation into a cylindrical vector beam (CVB), and a rectifying element (RE) configured to receive the CVB and generate a signal representing information of the incident radiation. The RE may include at least one toroid pair having a high conductivity toroid and a low conductivity toroid concentric with the high conductivity toroid, where each toroid pair, in response to receiving the CVB, creates a Hall voltage used to generate said signal representing information of the incident radiation. In some of the embodiments, the PCE substrate shape may include a plurality of pillars arranged as a lattice, protruding from a surface of the substrate. In some embodiments, the high conductivity toroid may be a metal toroid and the low conductivity toroid may be a semiconductor toroid.

In some embodiments, the pillars of the PCE may polarize the incident radiation into an azimuthal CVB (azm CVB) such that at any instance in time, at an observation plane normal to a propagation direction of the azm CVB, electric fields of the azm CVB are oriented in an azimuthal direction about a central axis that is parallel to the propagation direction of the azm CVB and are all pointing clockwise or counter-clockwise.

In some embodiments, the pillars of the PCE may polarize the incident radiation into a counter-oscillating azimuthal CVB (co-azm CVB), such that at any instance in time, at an observation plane normal to a propagation direction of the co-azm CVB, circular bands of electric fields of the co-azm CVB are oriented in azimuthal directions about a central axis that is parallel to the propagation direction of the co-azm CVB, and alternate between pointing clockwise and counter clockwise. In some embodiments, the at least one toroid pair may further include at least a first toroid pair and a second toroid pair being concentric with the first toroid pair. The PCE substrate may further include a first circular band of pillars to receive a first portion of the incident radiation and polarize it into a first portion of the CVB with polarization in a first azimuthal direction, and a second circular band of pillars to receive a second portion of the incident radiation and polarize it into a second portion of the CVB with polarization in a second azimuthal direction opposite to the first azimuthal direction. The first circular band of pillars may align with the first toroid pair, and the second circular band of pillars may align with the second toroid pair. Further, in some embodiments, each of the first plurality of pillars may be one of a rectangular or elliptical protrusion having corresponding dimensions and an orientation to form a half-wave plate to rotate the local electric field of the first portion of the incident radiation into the first azimuthal direction, and each of the second plurality of pillars may be one of a rectangular or elliptical protrusion having corresponding dimensions and an orientation to form a half-wave plate to rotate the local electric field of the second portion of the incident radiation into the second azimuthal direction.

In some embodiments, the pillars and the PCE substrate may be made of at least one dielectric material such that the pillars and the PCE substrate are transparent at a corresponding spectral bandwidth of the detector. In some embodiments, the first toroid pair may be outer and adjacent to the second toroid pair, such that, in response to the CVB, a first magnetic field, generated by a first high conductivity toroid of the first toroid pair, adds to a second magnetic field at a low conductivity toroid of the first toroid pair, the second magnetic field generated by a second high conductivity toroid of the second toroid pair.

In some embodiments, the RE may include a circuit that generates the signal by measuring the sum of the Hall voltage in the first toroid pair and the second toroid pair. In some further embodiments, the RE may include an unpaired high conductivity toroid being inner and adjacent to the second toroid pair, with the unpaired high conductivity toroid and the first high conductivity toroid in electrical contact with the circuit.

In some embodiments, the at least one toroid pair of the RE may include a third toroid pair and a fourth toroid pair each concentric with the first toroid pair. The PCE substrate may include a third circular band of pillars to receive a third portion of the incident radiation and polarize it into a third portion of the CVB with polarization in the first azimuthal direction. The PCE substrate may also include a fourth circular band of pillars to receive a fourth local portion of the incident radiation and polarize it into a fourth portion of the CVB with polarization in the second azimuthal direction. The third circular band of pillars may align with the third toroid pair, and the fourth circular band of pillars may align with the fourth toroid pair. Further, in some embodiments, a first of the at least two sub REs may detect a first range of wavelengths and may include the first toroid pair, the second toroid pair, and a corresponding unpaired high conductivity toroid adjacent to the first and second toroid pair. The first sub RE may be resonant at a first frequency band as a consequence of the geometries of its toroids. A second of the at least two sub REs may detect a second range of wavelengths and may include the third toroid pair, the fourth toroid pair, and a corresponding unpaired high conductivity toroid adjacent to the third and fourth toroid pairs. The second sub RE may be resonant at a second frequency band as a consequence of the geometries of its toroids.

In some embodiments, each high conductivity toroid may have at least one gap in its circumference to define a corresponding capacitance for the toroid pair, thereby causing a corresponding phase delay between a current, induced by the CVB, and a magnetic field in the low conductivity toroid of the same toroid pair, the magnetic field generated by the high conductivity toroid in response to the CVB. In some further embodiments, each high conductivity toroid may have the same number of gaps located at the same circumferential positions in each high conductivity toroid. In some other embodiments, the number of gaps in each toroid may be independent from those of other toroids, and the circumferential positions of gaps in each toroid may be independent from those of other toroids. Further, each low conductivity toroid may have at least one gap in its circumference.

In some embodiments, the RE may include a RE substrate, from a top view of the RE, below and in contact with the high conductivity toroid of each of the at least one toroid pair. Further, in some embodiments, each low conductivity toroid may be a portion of the RE substrate, from the top view of the RE, below a spacing between the high conductivity toroid of the same toroid pair and an adjacent high conductivity toroid. In yet some further embodiments, each high conductivity toroid may have at least one gap in its circumference to define a corresponding capacitance for the toroid pair, thereby causing a corresponding phase delay between a current, induced by the CVB, and a magnetic field in the low conductivity toroid of the same toroid pair, the magnetic field generated by the high conductivity toroid in response to the CVB.

In some embodiments, an imaging device is provided. The imaging device may comprise an array of electromagnetic radiation detectors and a circuit connected with said array of detectors to receive a signal from each detector. Each detector may comprise a polarization control element (PCE) configured to receive incident radiation and having a substrate with a shape to polarize said incident radiation into a cylindrical vector beam (CVB). Each detector may further comprise a rectifying element (RE) configured to receive the CVB and generate the signal representing information of the incident radiation. The RE may include at least one toroid pair having a high conductivity toroid and a low conductivity toroid concentric with the high conductivity toroid, where each toroid pair, in response to receiving the CVB, creates a Hall voltage used to generate said signal representing information of the incident radiation.

BRIEF DESCRIPTION OF THE DRAWINGS

FIGS. 3A-C depict the first embodiment of the polarization-control element (PCE) and FIG. 3D illustrates its operation.

DETAILED DESCRIPTION

Preferred embodiments of the present invention provide novel axial detectors (ADs) that, when employed in the IR range, both achieve high frame-rate videos and do not require the need for excessive cooling. The AD makes use of azimuthal CVBs (azm-CVBs) in conjunction with nonlinear Lorentz forces to rectify the fast-oscillating electric field.

Figure 2A:
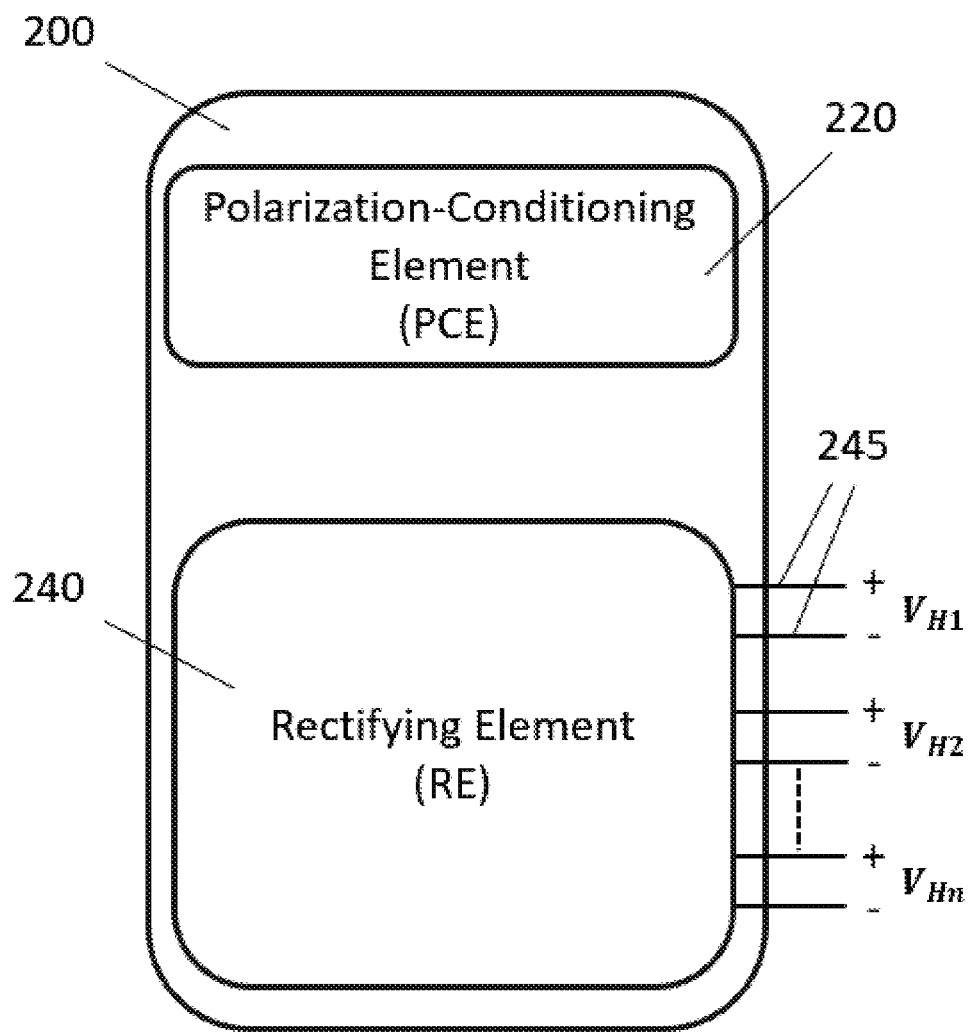
FIG. 2A enumerates the different components of an axial detector (AD) and FIG. 2B illustrates the different polarizations that are involved in the operation of an axial detector.
Figure 2B:
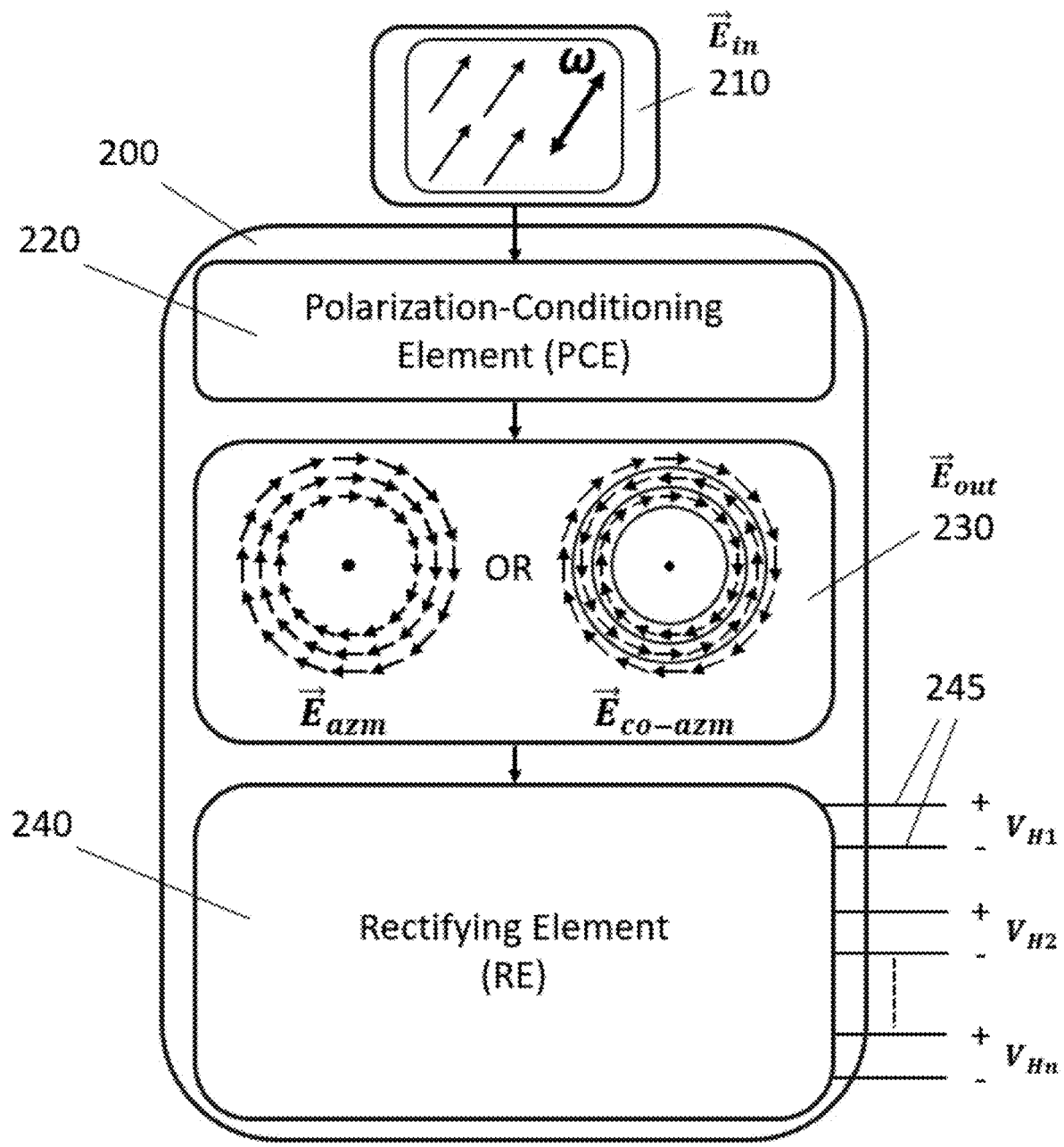

FIG. 2A enumerates the different components of an axial detector (AD) 200. It comprises a polarization-conditioning element 220 (PCE) and a rectifying element 240 (RE). FIG. 2B illustrates the different polarizations that are involved in the operation of an AD 200 along with its individual components. An incoming electromagnetic plane wave 210 having a linearly polarized electric field $\vec{E}_{in}$ passes through the PCE 220. Upon transmission, the polarization of the output electric field $\vec{E}_{out}$ 230, can be that of an azimuthal (azm) CVB $\vec{E}_{azm}$ or of a counter-oscillating azimuthal (co-azm) CVB $\vec{E}_{co-azm}$, depending on the embodiment of the PCE. Following, $\vec{E}_{out}$ 230 impinges onto the RE 240 whereat it interacts with its components to generate multiple DC voltages ($V_{H1}$, $V_{H2}$, . . . , $V_{Hn}$) at its output electrical leads 245 which are then used to represent information conveyed by the electric field $\vec{E}_{in}$.

Figure 2C:
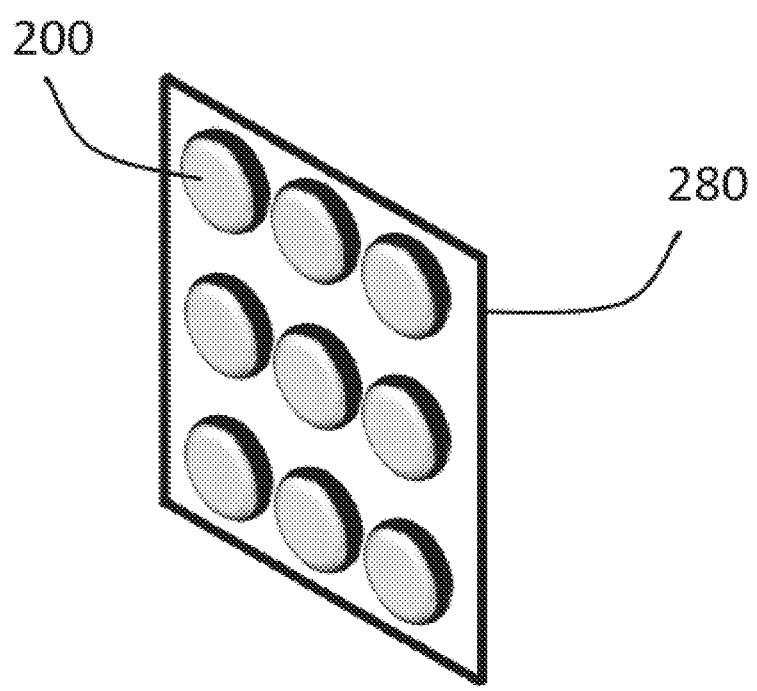
FIG. 2C depicts a typical arrangement for using an array of axial detectors in an imaging device.

FIG. 2C depicts an axial-detector (AD) based imaging chip. It comprises an array of ADs 200 that each are in electrical contact with a read-out integrated chip (ROIC) 280. Each AD receives incoming electromagnetic radiation and responds to the detected radiation through changes in the AD's direct-current (DC) output voltage, which is in turn converted into pixel information. The role of the ROIC is to measure the direct-current (DC) output voltage from individual ADs 200 and to convey this information to a data processing unit.

Figure 3D:
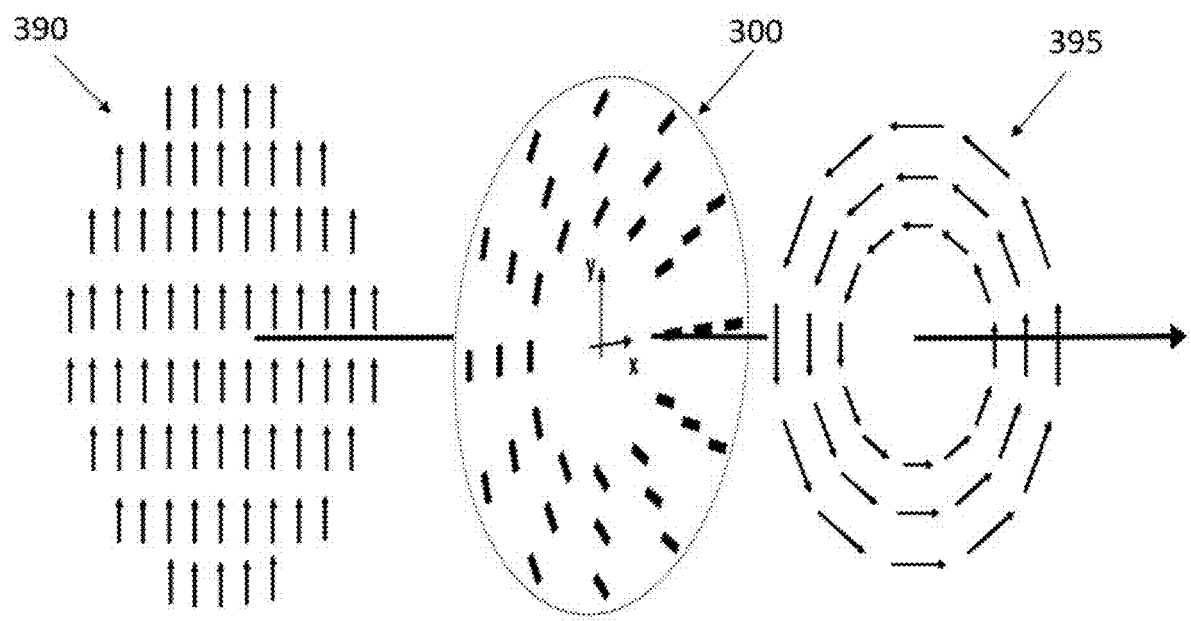

FIGS. 3A-C illustrate the first embodiment of the polarization-control element (PCE) 300. In this embodiment the building unit is a pillar 310, having a rectangular or elliptical cross section, that protrudes from the substrate 320 of the PCE as shown in FIG. 3A. The materials chosen for both pillar and substrate can be dielectrics having different refractive indexes that are transparent at the design spectral bandwidth of the AD. It is also possible that the pillars are fabricated from the same material of the substrate, in other words, the pillars can be carved out from the substrate material. The pillars 310 are arranged in a lattice geometry 330, that can be hexagonal or square, as shown in FIG. 3B and cover the surface of the PCE 300. The dimensions of the pillars 310 are engineered such that each one acts as a half-wave plate, locally rotating an incident linear polarization, with the rotation angle being controlled by the pillar's orientation with respect to the direction of the incident electric field. For example, an electric field that points parallel to the fast axis 340 passes without a change to its direction, while an electric field that is parallel to the long dimension of the pillar, also known as the slow optical axis 350, is rotated by 180 degrees. The angle θ 360 between the slow optical axis and the Cartesian x axis indicates the orientation of each pillar 310. Throughout the surface of the PCE, the angle θ changes as a function of the azimuthal angle φ 370 as shown in FIG. 3C. In a typical embodiment, the angle θ depends on the azimuthal angle φ following the equation θ(x,y)=φ/2. Such a structure is known in the literature as a q plate. See, e.g., Kruk, Sergey, et al. *Invited Article: Broadband highly efficient dielectric metadevices for polarization control*, APL Photonics, 1(3), 5-8 (2016). In FIG. 3D, the operation of the PCE is illustrated. A linearly polarized wave 390 whose electric field points in the y direction is converted into an azimuthal CVB 395 upon passage through the PCE 300 according to the first embodiment.

Figure 4A:
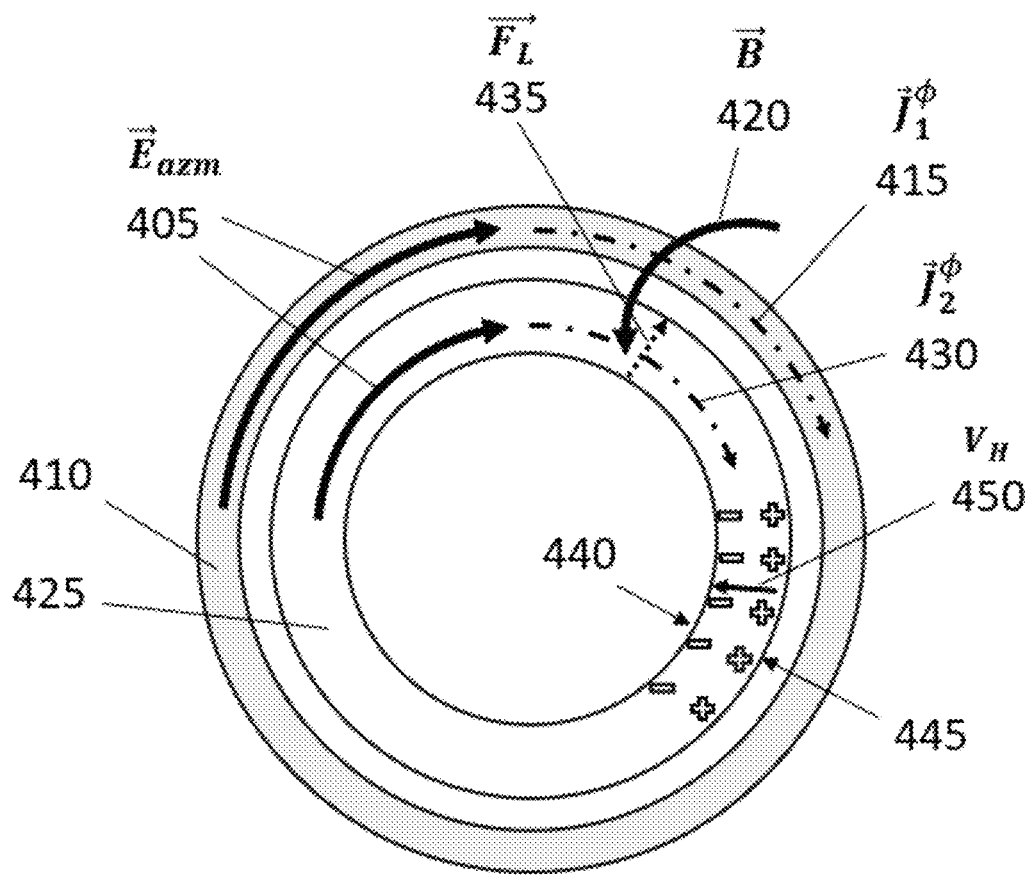
FIGS. 4A and 4B illustrate a conceptual diagram for the operation of the rectifying element (RE).
Figure 4B:
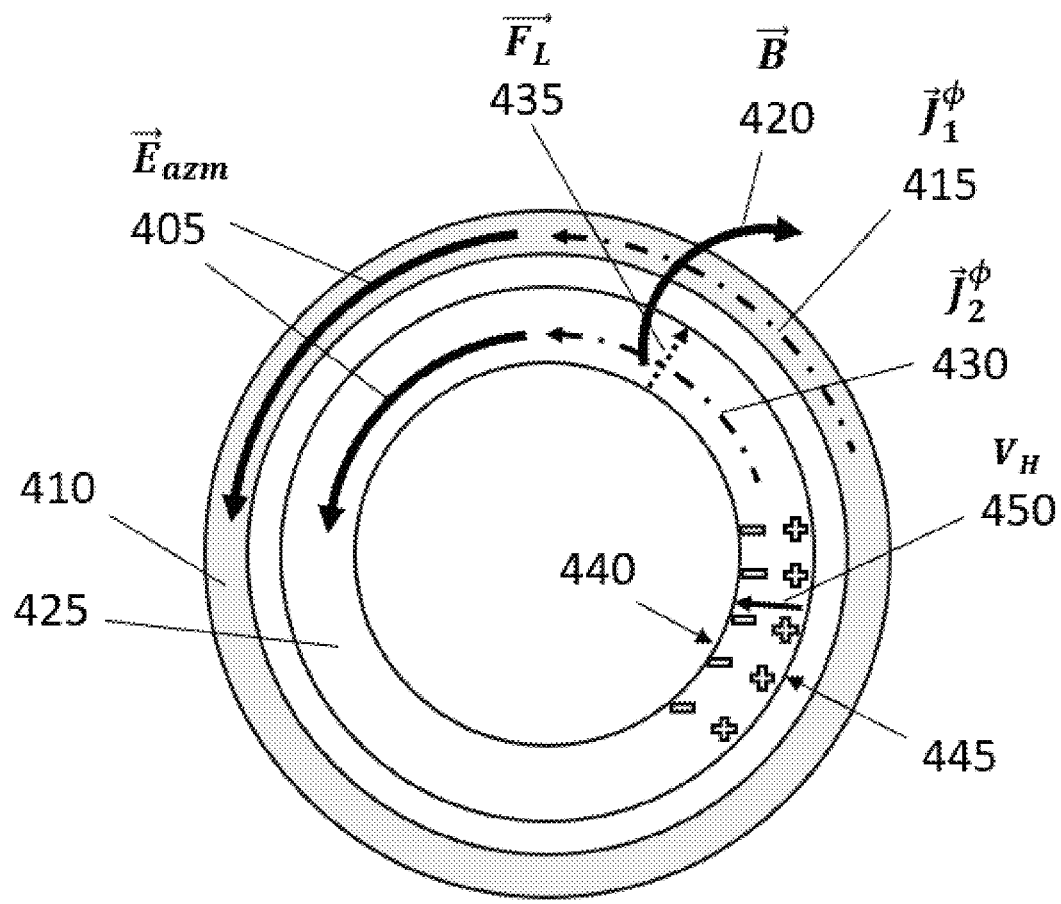

FIG. 4A illustrates a conceptual diagram for the basic building block of the rectifying element (RE) and its operation. It consists of a pair of toroids of two different materials. The first toroid 410 is fabricated from a high conductivity material such as a metal, for example copper, while the second toroid 425 is fabricated from a low conductivity material such as a doped semiconductor. Hereafter we refer to the first type of toroids 410 as metal toroids and the second type 425 as semiconductor toroids. When the electric field of an azimuthal CVB ($\vec{E}_{azm}$) 405 impinges onto the metal and semiconductor toroids it induces current fluxes ($\vec{J}_1^\phi$) 415 and ($\vec{J}_2^\phi$) 430 in the first and second toroids, respectively, with $\vec{J}_1^\phi$ being larger than $\vec{J}_2^\phi$. A resulting net magnetic field $\vec{B}$ 420 exerts a Lorentz force $\vec{F}_L$ 435 on the moving charges in the semiconductor toroid 425 which leads to the separation of the positive charges from the negative charges. In one embodiment the positive charges accumulate on the outer surface 445 of the semiconductor toroid 425 while the negative charges accumulate on the inner surface 440, thereby giving rise to a potential difference $V_H$ 450 that can be measured. For optimal operation, the phase difference between $\vec{J}_2^\phi$ and $\vec{B}$ should be mπ where m is an integer. FIG. 4A illustrates the operation of the RE during the first half of the period of the incoming radiation, $\vec{E}_{azm}$ pointing clockwise, while FIG. 4B depicts the same information during the second half of the period of the incoming radiation, $\vec{E}_{azm}$ pointing counter clockwise.

Figure 1A:
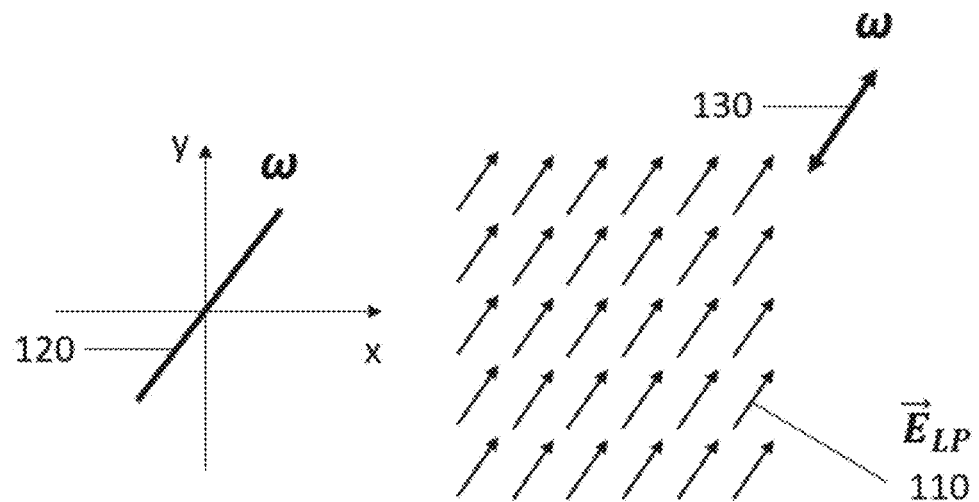
FIG. 1A depicts the amplitude and direction of the electric field at a fixed time and observation plane for a linearly polarized wave.
Figure 1B:
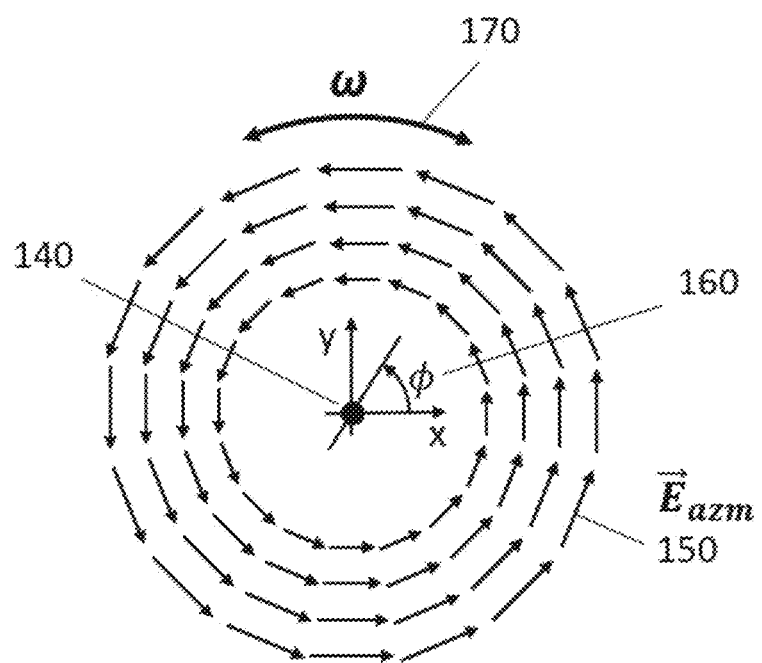
FIG. 1B depicts the amplitude and direction of the electric field at a fixed time and observation plane for an azimuthal cylindrical vector beam (CVB).
Figure 5A:
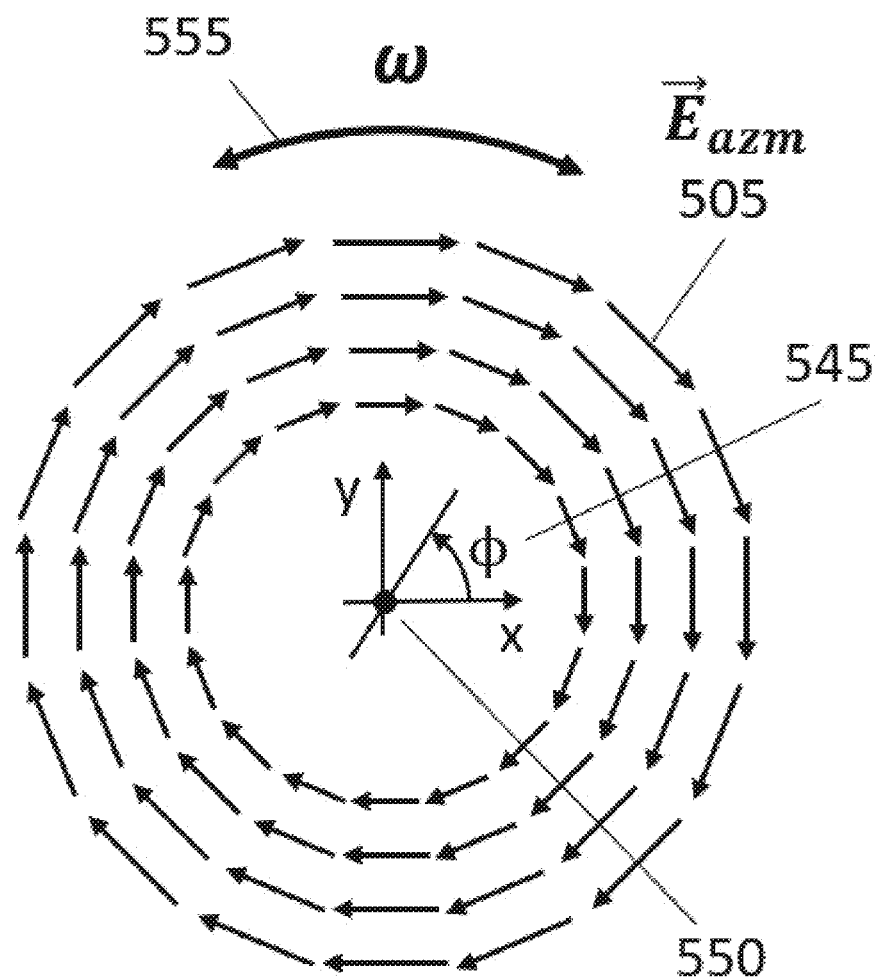
FIGS. 5A-C present the problem of magnetic-fields cancellation when an azimuthal CVB is employed with an rectifying element (RE) that comprises multiple pairs of rectifying toroids.
Figure 5B:
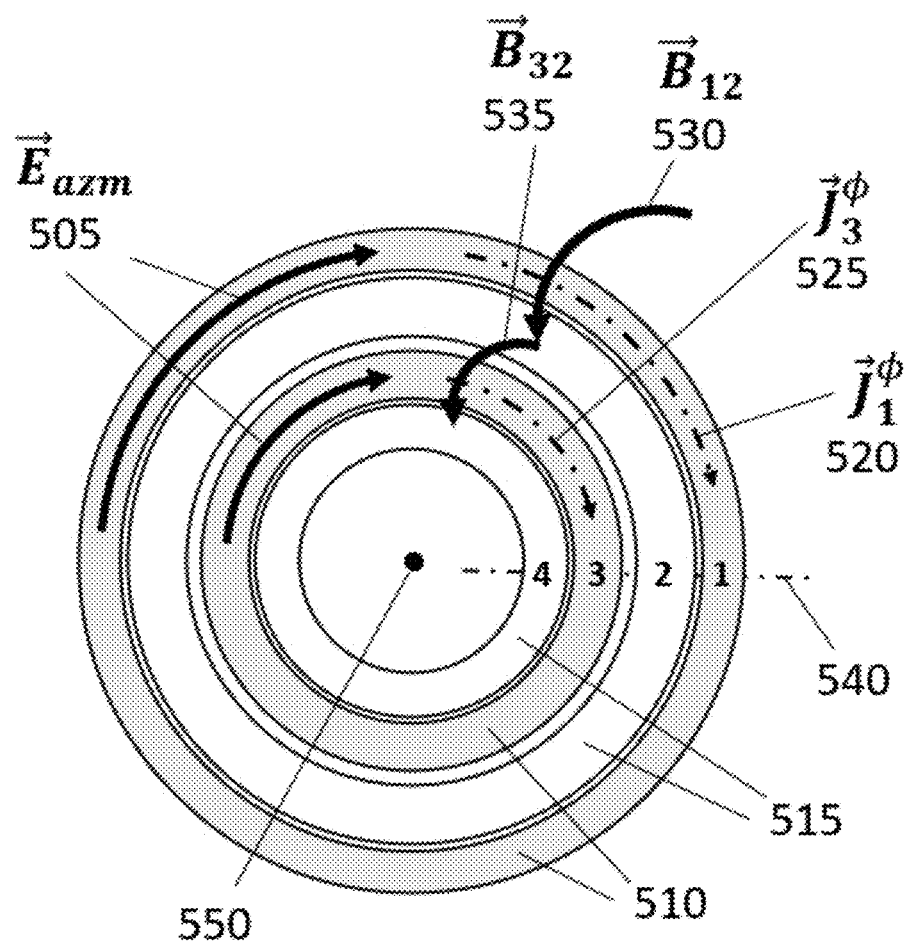
Figure 5C:
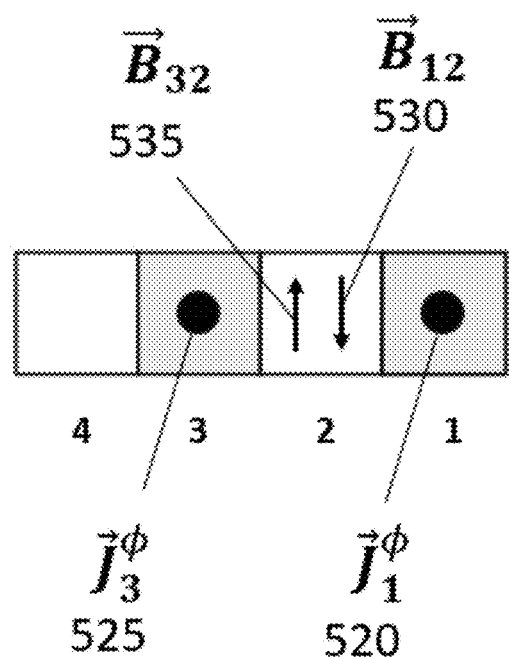

FIGS. 5A-C present the problem of magnetic-fields cancellation. This problem occurs when an azimuthal CVB is employed with a RE that comprises multiple metal-semiconductor toroid pairs. An RE with only one toroid pair is relatively simple and easy to manufacture. However, multiple toroid pairs allow the RE to have higher sensitivity and detect a weaker signal. FIG. 5A depicts a typical azimuthal CVB identical to the one presented in FIG. 1B. The azimuthal CVB propagates about an axis 550 with its electric field $\vec{E}_{azm}$ 505 pointing in the negative direction of the azimuthal angle ϕ 545. As time evolves, the magnitude of the electric field vector $\vec{E}_{azm}$ oscillates sinusoidally at an angular frequency ω such that it points in a clockwise direction during one half of the oscillation period and in a counter-clockwise direction for the other half of the period, as illustrated by the thick double-sided arrow line 555. An RE that consists of two pairs of metal-semiconductor toroids is shown in FIG. 5B whereat the four toroids are numbered 1 to 4. Toroids number 1 and 3 are metal toroids 510 while toroids 2 and 4 are semiconductor toroids 515. When the electric field $\vec{E}_{azm}$ 505 impinges on this RE it induces the current densities $\vec{J}_1^\phi$ 520 and $\vec{J}_3^\phi$ 525 in the metal toroids 1 and 3, respectively. The current densities $\vec{J}_1^\phi$ and $\vec{J}_3^\phi$ induce the magnetic fields $\vec{B}_{12}$ 530 and $\vec{B}_{32}$ 535, respectively, in the semiconductor toroid number 2. As $\vec{J}_1^\phi$ and $\vec{J}_3^\phi$ circulate in the same direction, clockwise in FIG. 5B, the induced magnetic fields $\vec{B}_{12}$ and $\vec{B}_{32}$ in toroid number 2 oppose each other and cancel out. This is better visualized in the cross section, shown in FIG. 5C, along the dash-dot line 540. In the metal toroids 1 and 3, the current densities $\vec{J}_1^\phi$ and $\vec{J}_3^\phi$ are presented as black filled circles to indicate that the current is flowing in the direction normal to the paper and coming out towards the reader. Using the right-hand rule, it is clear that the magnetic vectors $\vec{B}_{12}$ and $\vec{B}_{32}$ point in opposite directions within toroid number 2.

Figure 6A:
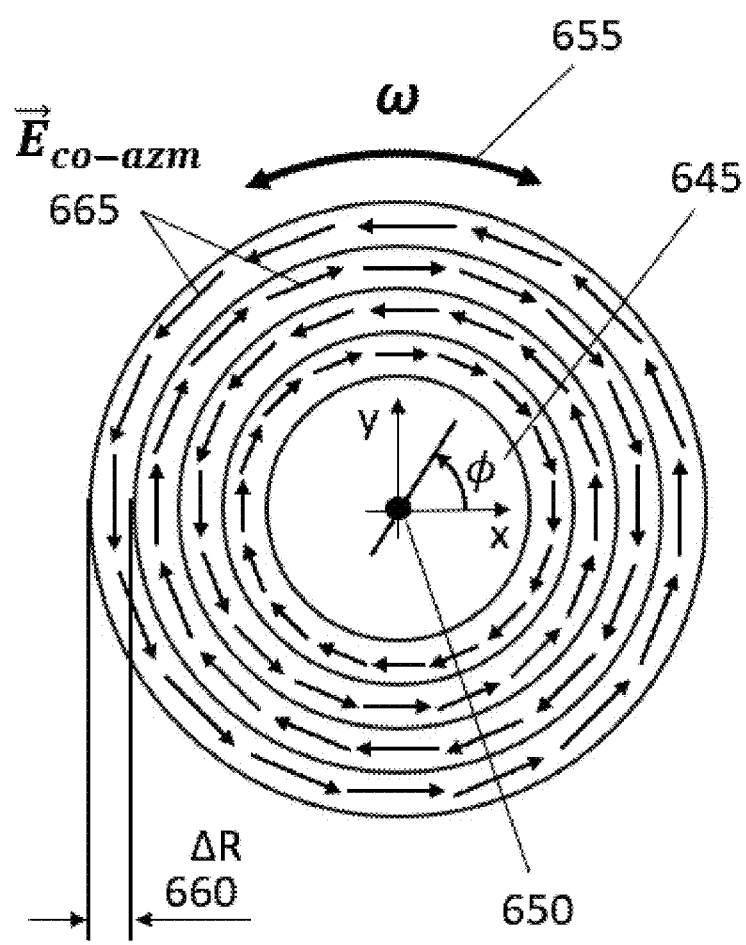
FIGS. 6A-C present the use of counter-oscillating-azimuthal CVBs as a workaround to the problem of the magnetic-fields cancellation that was presented in FIGS. 5A-C.
Figure 6B:
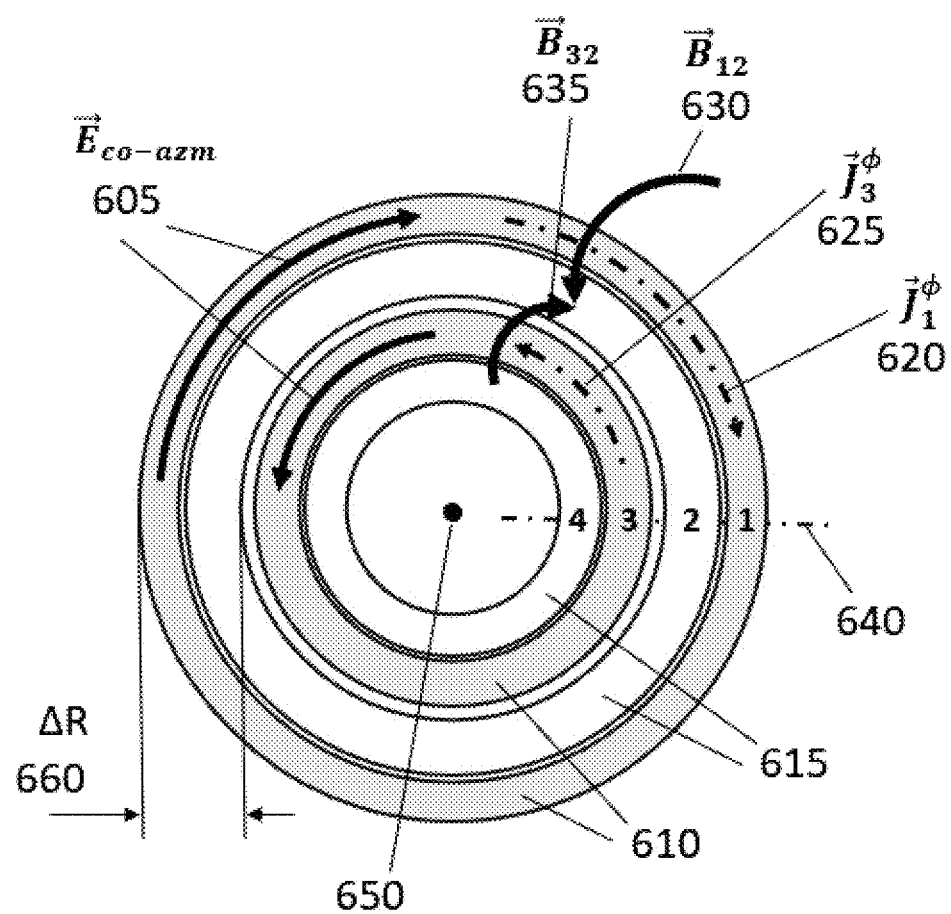
Figure 6C:
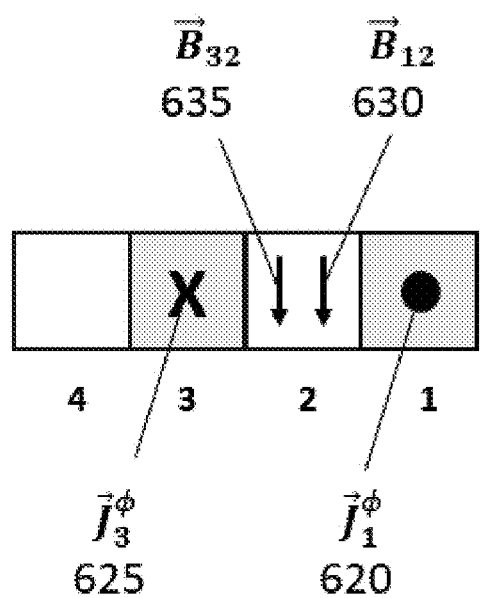

This magnetic-field cancellation can be circumvented by employing a counter-oscillating azimuthal (co-azm) CVB. The electric field of a co-azm CVB, ($\vec{E}_{co\text{-}azm}$) is shown in FIG. 6A. Unlike the azimuthal CVB, shown in FIG. 5A, whereat the electric field $\vec{E}_{azm}$ points clockwise everywhere within the observation plane, the field $\vec{E}_{co\text{-}azm}$ 665 alternates its pointing direction from the positive-ϕ (counter-clockwise) direction, to the negative-ϕ (clockwise) direction, within the bounds of successive nested concentric circular bands of width ΔR 660. In other words, at every point within each circular band, the field $\vec{E}_{co\text{-}azm}$ oscillates in phase similar to that of an azimuthal CVB but the fields within the successive bands have a π phase difference, i.e., they are rotated by 180 degrees, relative to each other. Each circular band of the co-azm CVB is designed to geometrically coincide onto a metal-semiconductor pair of the RE element. In some preferred embodiments, each metal-semiconductor pair of the RE element has a width that matches the width ΔR 660 of the circular band of the co-azm CVB that impinges on it. When the co-azm CVB impinges on the RE shown in FIG. 6B, whereat toroids number 1 and 3 are metal toroids 610 while toroids 2 and 4 are semiconductor toroids 615, the induced current densities $\vec{J}_1^\phi$ 620 and $\vec{J}_3^\phi$ 625 in the successive metal toroids 1 and 3 (toroids 610) circulate in opposite directions thereby causing the induced magnetic fields $\vec{B}_{12}$ 630 and $\vec{B}_{32}$ 635 in semiconductor toroid number 2 (toroid 615) to be parallel to each other and to add up. This is better visualized in the cross section, shown in FIG. 6C, along the dash-dot line 640. In the metal toroids 1 and 3, the current densities $\vec{J}_1^\phi$ and $\vec{J}_1^\phi$ are presented as a black filled circle and as a thick X mark, respectively. This indicates that the currents are both flowing in a direction normal to the paper, coming out towards the reader in toroid number 1 and going into the paper in toroid number 3. Using the right-hand rule, it is clear that, when a co-azm CVB is employed, the magnetic vectors $\vec{B}_{12}$ and $\vec{B}_{32}$ add up as they point in the same direction within the semiconductor toroid number 2.

Figure 7C:
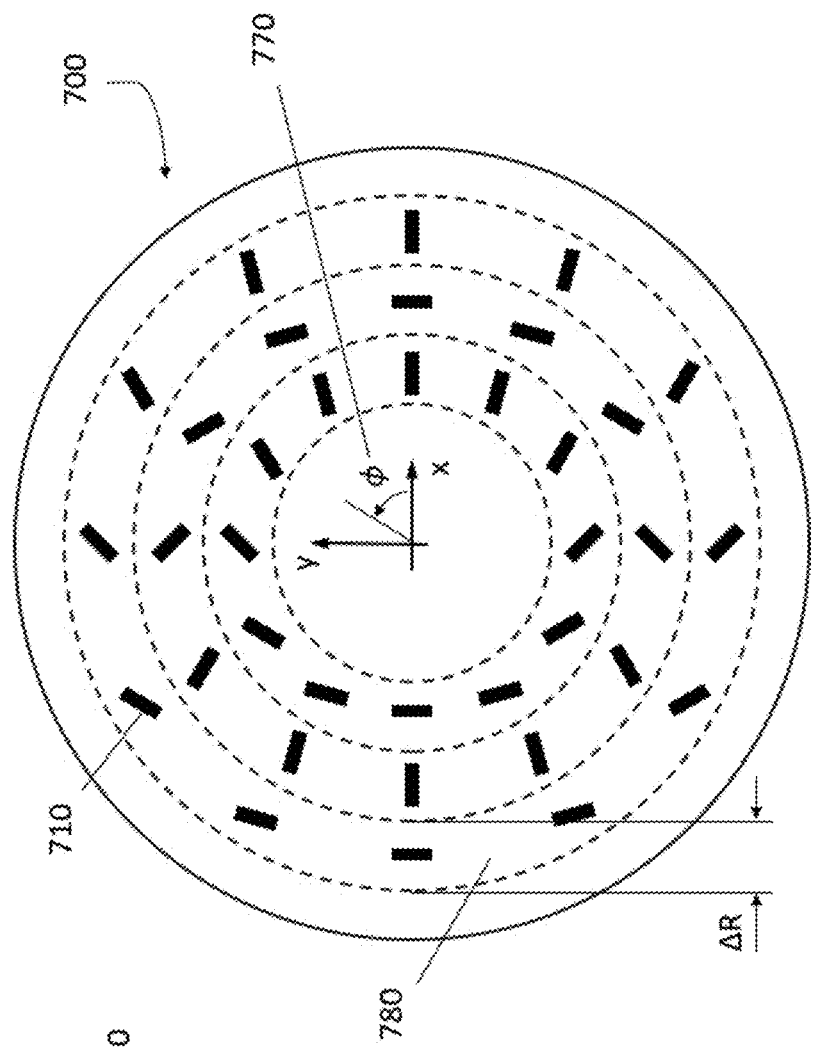
FIGS. 7A-C depict the second embodiment of the PCE that is used to generate a counter-oscillating azimuthal CVB and FIG. 7D illustrates its operation.
Figure 7B:
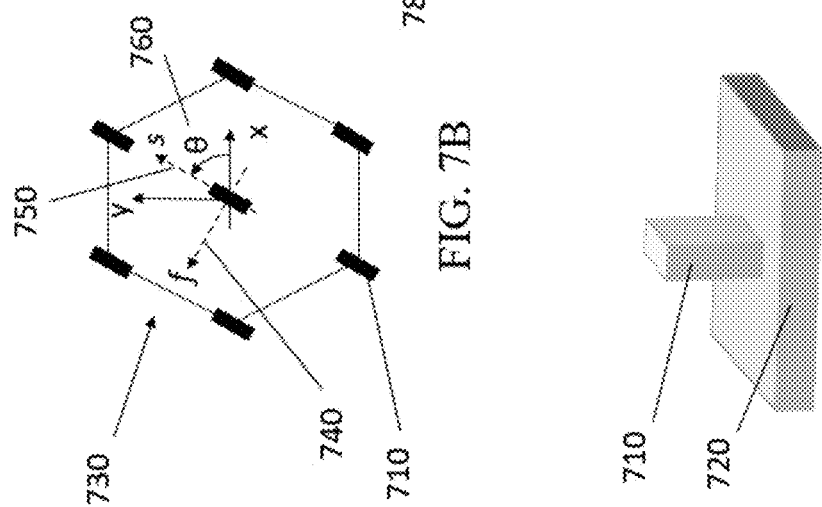
Figure 7A:
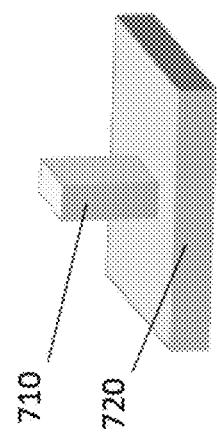
Figure 7D:
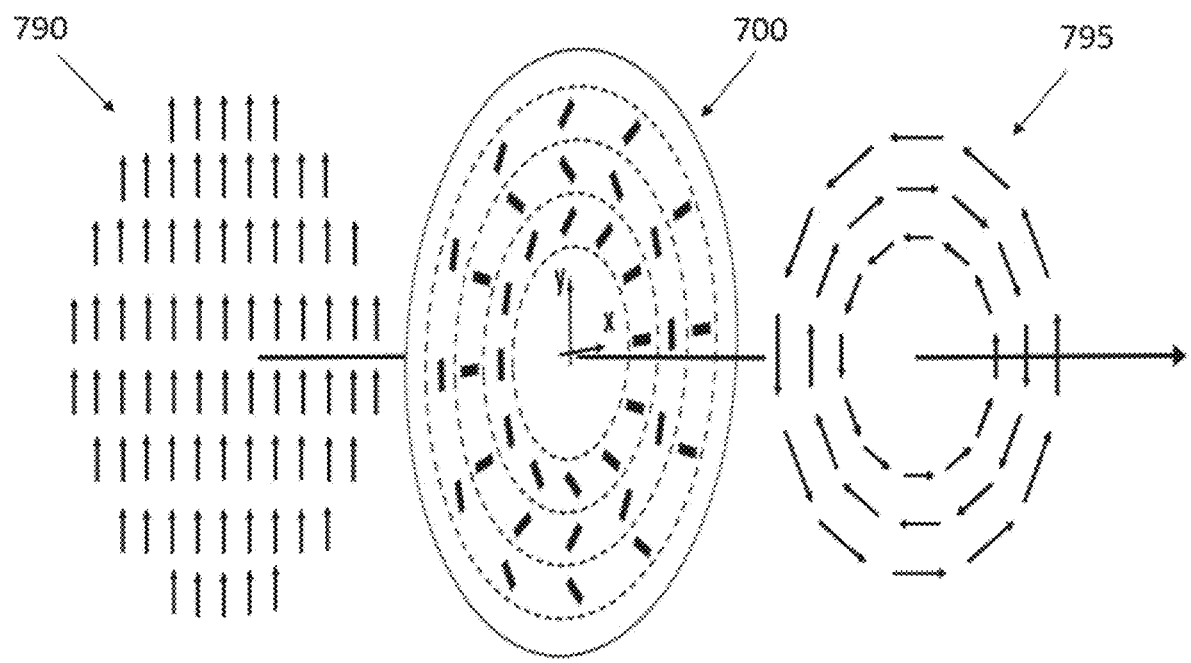

FIGS. 7A-C illustrate the second embodiment of the polarization-control element (PCE) 700 that is used to generate the co-azm CVBs. Similar to the first embodiment, the building unit is a pillar 710, having a rectangular or elliptical cross section, that protrudes from the substrate 720 of the PCE as shown in FIG. 7A. The materials chosen for both pillar and substrate can be dielectrics having different refractive indexes that are transparent at the design spectral bandwidth of the AD. It is also possible that the pillars are fabricated from the same material of the substrate, in other words, the pillars can be carved out from the substrate material. The pillars 710 are arranged in a lattice geometry 730, that can be hexagonal or square, as shown in FIG. 7B and cover the surface of the PCE 700. The dimensions of the pillars 710 are engineered such that each one acts as a half-wave plate, locally rotating an incident linear polarization, with the rotation angle being controlled by the pillar's orientation with respect to the direction of the incident electric field. For example, an electric field that points parallel to the fast axis 740 passes without a change to its direction, while an electric field that is parallel to the long dimension of the pillar, also known as the slow optical axis 750, is rotated by 180 degrees. The angle θ 760 between the slow optical axis and the Cartesian x axis indicates the orientation of each pillar 710. Throughout the surface of the PCE, the angle θ changes as a function of the azimuthal angle ϕ 770 as shown in FIG. 7C. However, unlike the first PCE embodiment 300 whereat the angle θ(x,y) depends on the azimuthal angle ϕ following a single equation, in a typical second embodiment, within successive radial bands 780 of width ΔR, the orientation angle θ(x,y) follows the equations θ(x,y)=(ϕ/2) and θ(x,y)=(ϕ/2+π/2), alternatively. In other words, in this second embodiment, the pattern of the pillars 710 is rotated by a half turn between the successive circular bands of the PCE 700. In FIG. 7D, the operation of the PCE 700 according to the second embodiment is illustrated. A linearly polarized wave 790 whose electric field points in the y direction is converted into a counter-oscillating azimuthal CVB 795 upon passage through the PCE 700.

Figure 8A:
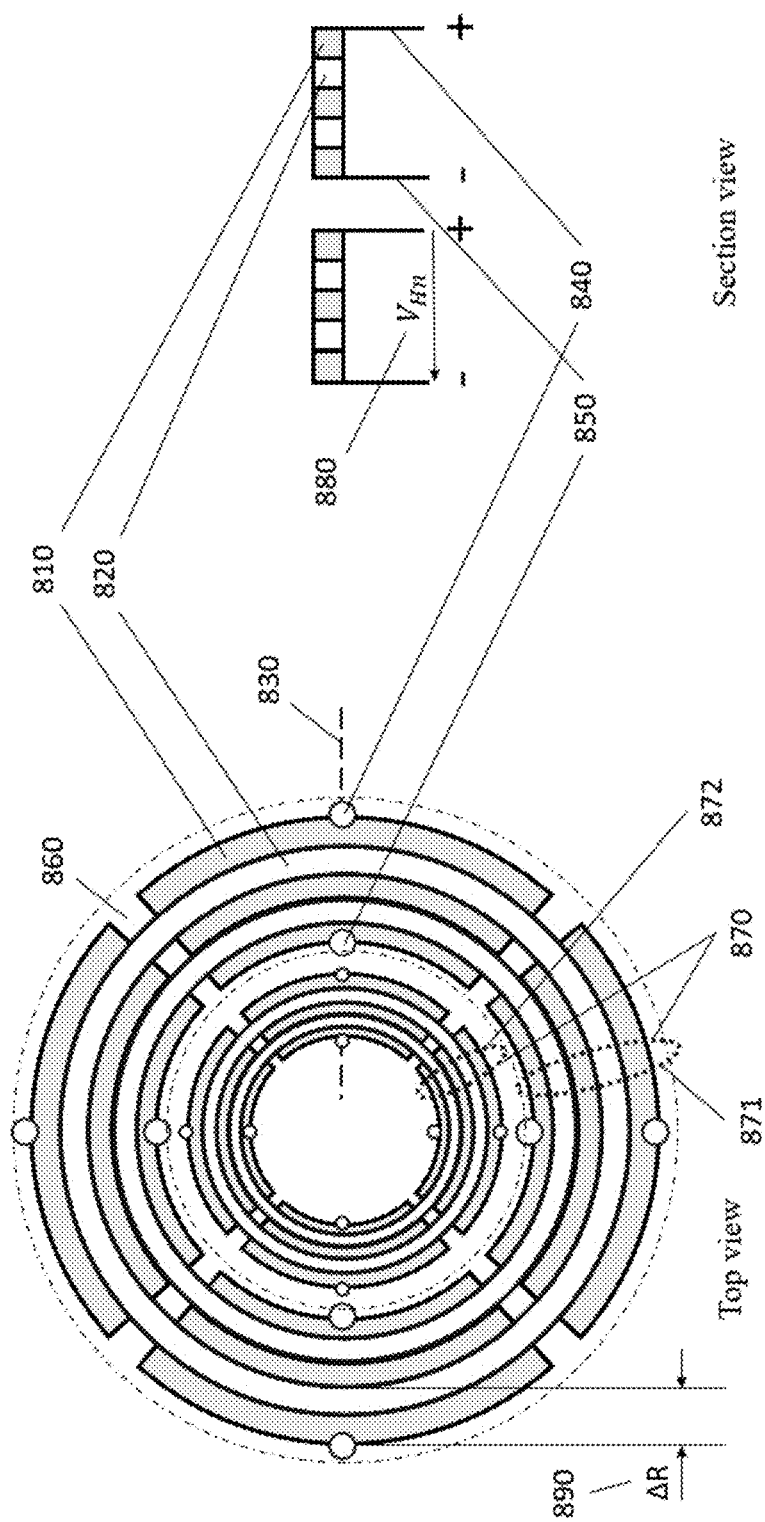
FIGS. 8A-C illustrate three embodiments of the rectifying element (RE), (a) the first embodiment, (b) the second embodiment and (c) the third embodiment.

FIG. 8A illustrates a first embodiment of the rectifying element (RE). The structure comprises concentric toroids whereat the adjacent toroids are in electrical contact with each other and with successive toroids alternating between a metal 810 toroid and a semiconductor 820 toroid. Multiple gaps 860 that exist along the circumference of each metal toroid introduce a capacitive element to its equivalent electrical circuit. This serves to adjust the phase between the magnetic field and the current in the semiconductor toroids. Separate groups of abutting metal 810 and semiconductor 820 toroids act as separate sub rectifying elements (sub REs) 870 (e.g., 871 and 872) that are resonant at different frequency bands. By way of example, FIG. 8A shows a RE that comprises two sub REs 870, an outer sub RE 871 and an inner sub RE 872, with the outer RE 871 bounded by the two dash-dot circles for clarity. Sub RE 871 is resonant at a different frequency band than sub RE 872, and thereby configured to detect incoming radiations at different frequencies. The outermost and innermost metal toroids of a sub RE 870 are connected to output electrical leads 840 and 850 whereat the generated Hall voltage $V_{Hn}$ 880 of the nth sub RE is measured by the readout circuit 280 of FIG. 2C. The Voltage $V_{Hn}$ is a summation of the individual Hall voltages that are generated in the semiconductor toroids 820 that are part of the nth sub RE. The top view of the RE according to the first embodiment is shown on the left and a section view along the line 830 is shown on the right. When this RE embodiment is employed with the second embodiment of the PCE, shown in FIGS. 7A-C, successive metal-semiconductor toroid pairs align with the respective circular band of the PCE and their width ΔR 890 preferably matches the corresponding value shown in FIG. 7C. One unpaired metal toroid exists within each sub RE whose purpose is to act as an electrical contact.

Figure 8B:
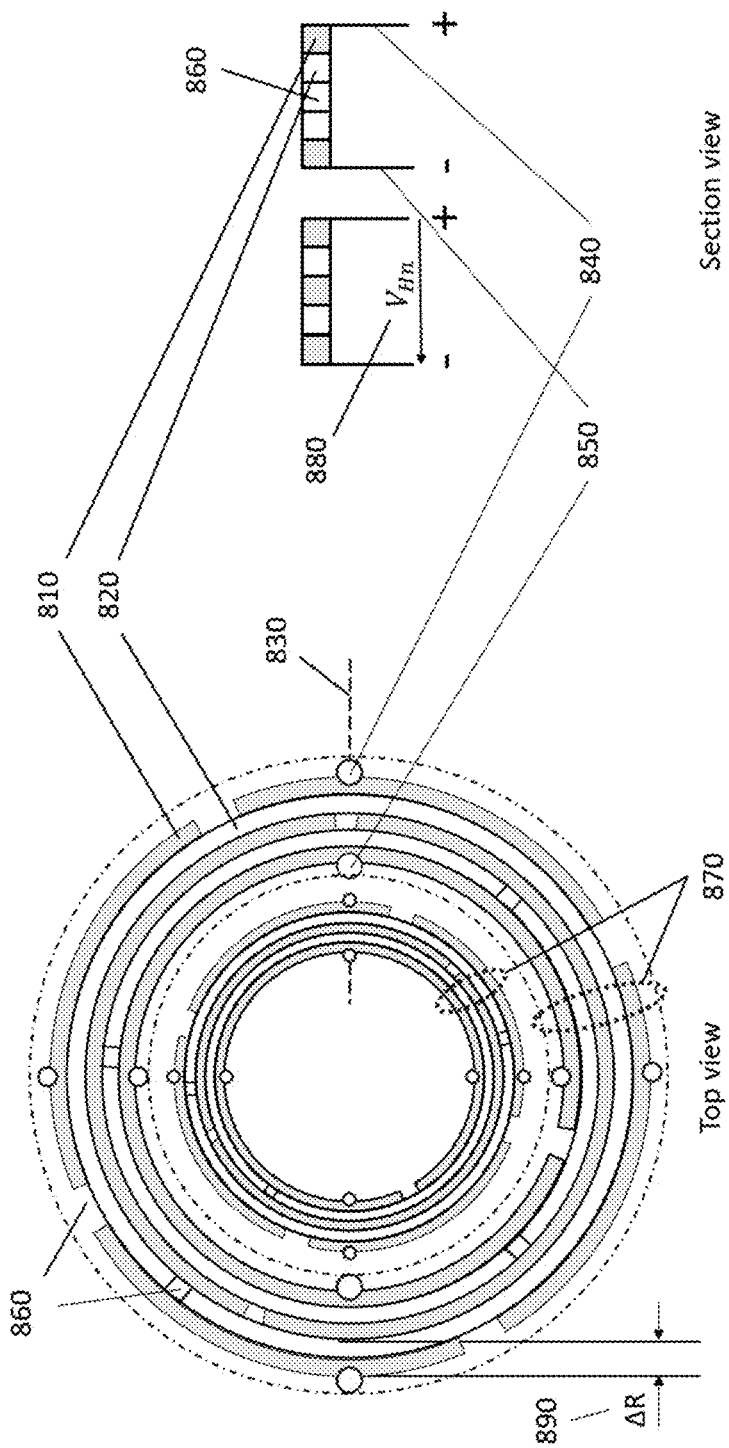

FIG. 8B illustrates a second embodiment of the rectifying element (RE). Unlike the preceding embodiment, in this embodiment gaps 860 can exist along the circumference of each metal and semiconductor toroid. The number of gaps 860 and their circumferential positions, that are associated with each toroid, are independent from those of other toroids. This expanded design space allows for a better control of the electrical response of the sub ADs. For example, sub ADs can be designed to have either an ultra-narrow or ultra broad resonance bandwidth. Moreover, the expanded design flexibility should result in a more efficient axial detector.

Figure 8C:
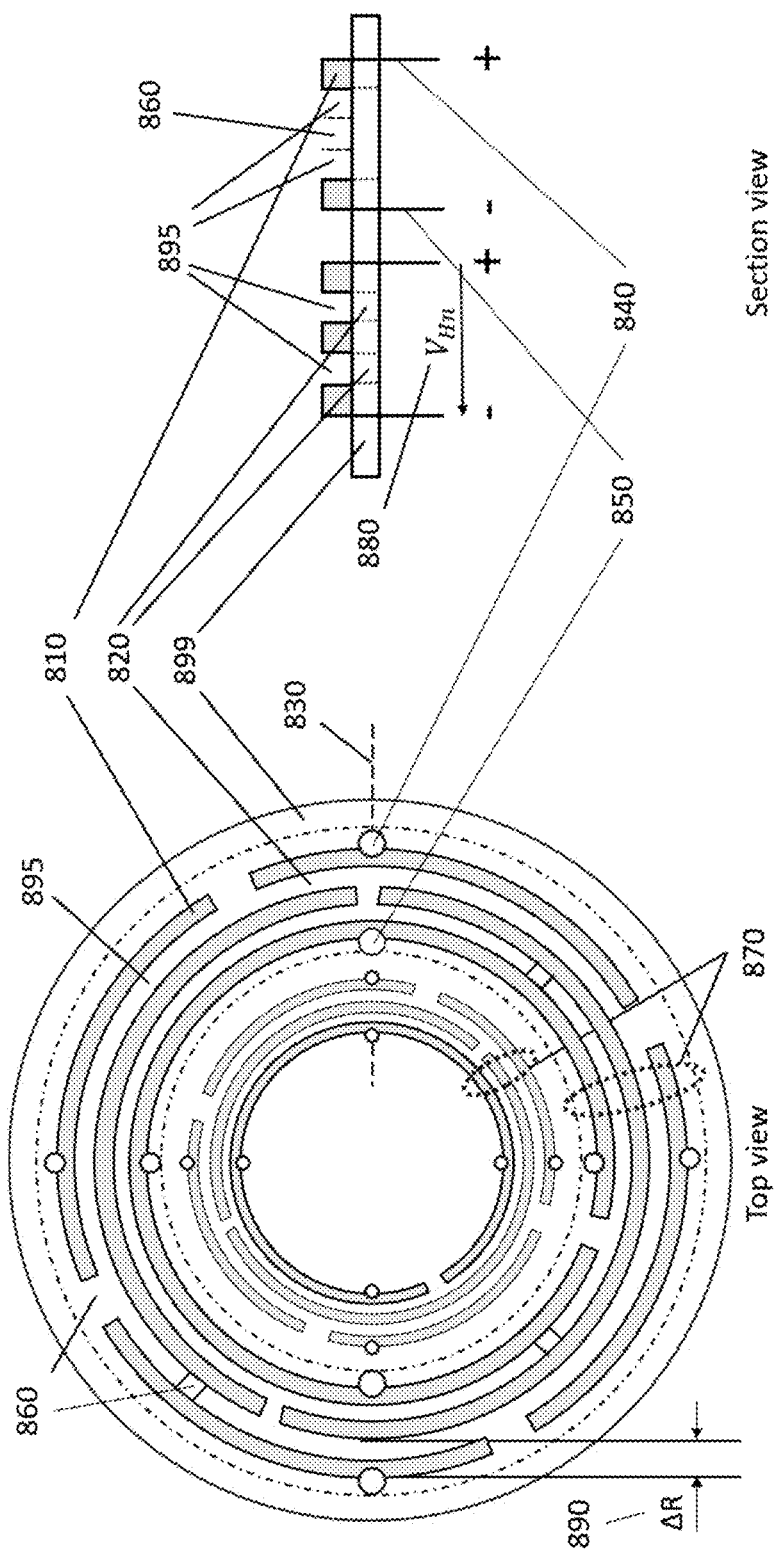

FIG. 8C illustrates a third embodiment of the rectifying element (RE). Unlike the preceding two embodiments shown in FIGS. 8A and B respectively, whereat the metal 810 and semiconductor 820 toroids were intertwined, in this embodiment the metal toroids 810 are laid atop a continuous semiconductor layer 899 with a toroid-shaped spacing 895 between the successive metal toroids. This spacing 895 does not serve the same electrical purpose as the gaps 860 within the circumference of a metal or a semiconductor toroid. As the metal toroids 810 block the incoming CVB radiation from reaching the underlying semiconductor layer 899, the semiconductor toroids 820 are virtually formed in the continuous semiconductor layer 899, just below the spacing 895. The gaps 860 within the metal and semiconductor toroids can be structured following any of the arrangements of the previous two embodiments in FIGS. 8A and B. For example, shown in FIG. 8C, the gaps 860 are structured following the second embodiment of FIG. 8B. FIG. 8C shows a top view of the RE according to the third embodiment on the left and a section view along the line 830 on the right.

The invention claimed is:

1. An electromagnetic radiation detector, comprising:
   a polarization control element (PCE) configured to receive incident radiation and having a substrate with a shape to polarize said incident radiation into a cylindrical vector beam (CVB); and
   a rectifying element (RE) configured to receive the CVB and generate a signal representing information of the incident radiation, the RE including at least one toroid pair having a high conductivity toroid and a low conductivity toroid concentric with the high conductivity toroid; wherein each toroid pair, in response to receiving the CVB, creates a Hall voltage used to generate said signal representing information of the incident radiation.

2. The detector of claim 1, wherein the PCE substrate shape includes a plurality of pillars arranged as a lattice, protruding from a surface of the substrate.

3. The detector of claim 2, wherein the pillars of the PCE polarize the incident radiation into an azimuthal CVB (azm CVB) such that at any instance in time, at an observation plane normal to a propagation direction of the azm CVB, electric fields of the azm CVB are oriented in an azimuthal direction about a central axis that is parallel to the propagation direction of the azm CVB and are all pointing clockwise or counter-clockwise.

4. The detector of claim 2, wherein the pillars of the PCE polarize the incident radiation into a counter-oscillating azimuthal CVB (co-azm CVB), such that at any instance in time, at an observation plane normal to a propagation direction of the co-azm CVB, circular bands of electric fields of the co-azm CVB are oriented in azimuthal directions about a central axis that is parallel to the propagation direction of the co-azm CVB, and alternate between pointing clockwise and counter clockwise.

5. The detector of claim 4, wherein the at least one toroid pair includes at least a first toroid pair and a second toroid pair being concentric with the first toroid pair; and wherein the PCE substrate includes a first circular band of pillars to receive a first portion of the incident radiation and polarize it into a first portion of the CVB with polarization in a first azimuthal direction, and includes a second circular band of pillars to receive a second portion of the incident radiation and polarize it into a second portion of the CVB with polarization in a second azimuthal direction opposite to the first azimuthal direction, and wherein the first circular band of pillars aligns with the first toroid pair; and the second circular band of pillars aligns with the second toroid pair.

6. The detector of claim 5, wherein:
   each of the first plurality of pillars is one of a rectangular or elliptical protrusion having corresponding dimensions and an orientation to form a half-wave plate to rotate the local electric field of the first portion of the incident radiation into the first azimuthal direction, and
   each of the second plurality of pillars is one of a rectangular or elliptical protrusion having corresponding dimensions and an orientation to form a half-wave plate to rotate the local electric field of the second portion of the incident radiation into the second azimuthal direction.

7. The detector of claim 2, wherein the pillars and the PCE substrate are made of at least one dielectric material such that the pillars and the PCE substrate are transparent at a corresponding spectral bandwidth of the detector.

8. The detector of claim 2, wherein the first toroid pair is outer and adjacent to the second toroid pair, such that, in response to the CVB, a first magnetic field, generated by a first high conductivity toroid of the first toroid pair, adds to a second magnetic field at a low conductivity toroid of the first toroid pair, the second magnetic field generated by a second high conductivity toroid of the second toroid pair.

9. The detector of claim 5, wherein the RE includes a circuit that generates the signal by measuring the sum of the Hall voltage in the first toroid pair and the second toroid pair.

10. The detector of claim 9, wherein the RE includes an unpaired high conductivity toroid being inner and adjacent to the second toroid pair, wherein the unpaired high conductivity toroid and the first high conductivity toroid are in electrical contact with the circuit.

11. The detector of claim 5, wherein:
   the at least one toroid pair of the RE includes a third toroid pair and a fourth toroid pair each concentric with the first toroid pair;
   the PCE substrate includes a third circular band of pillars to receive a third portion of the incident radiation and polarize it into a third portion of the CVB with polarization in the first azimuthal direction, and includes a fourth circular band of pillars to receive a fourth local portion of the incident radiation and polarize it into a fourth portion of the CVB with polarization in the second azimuthal direction; and the third circular band of pillars aligns with the third toroid pair, and the fourth circular band of pillars aligns with the fourth toroid pair.

12. The detector of claim 11, having at least two sub rectifying elements (sub REs),
wherein a first of the at least two sub REs detects a first range of wavelengths and includes the first toroid pair, the second toroid pair, and a corresponding unpaired high conductivity toroid adjacent to the first and second toroid pair, and wherein the first sub RE is resonant at a first frequency band as a consequence of the geometries of its toroids;
wherein a second of the at least two sub REs detects a second range of wavelengths and includes the third toroid pair, the fourth toroid pair, and a corresponding unpaired high conductivity toroid adjacent to the third and fourth toroid pairs, and wherein the second sub RE is resonant at a second frequency band as a consequence of the geometries of its toroids.

13. The detector of claim 1, wherein each high conductivity toroid has at least one gap in its circumference to define a corresponding capacitance for the toroid pair, to cause a corresponding phase delay between a current, induced by the CVB, and a magnetic field in the low conductivity toroid of the same toroid pair, the magnetic field generated by the high conductivity toroid in response to the CVB.

14. The detector of claim 13, wherein each high conductivity toroid has the same number of gaps located at the same circumferential positions in each high conductivity toroid.

15. The detector of claim 13, wherein each low conductivity toroid has at least one gap in its circumference, wherein the number of gaps in each toroid is independent from those of other toroids, and wherein the circumferential positions of gaps in each toroid are independent from those of other toroids.

16. The detector of claim 1, wherein the RE includes a RE substrate, from a top view of the RE, below and in contact with the high conductivity toroid of each of the at least one toroid pair.

17. The detector of claim 16, wherein each low conductivity toroid is a portion of the RE substrate, from the top view of the RE, below a spacing between the high conductivity toroid of the same toroid pair and an adjacent high conductivity toroid.

18. The detector of claim 17, wherein each high conductivity toroid has at least one gap in its circumference to define a corresponding capacitance for the toroid pair, to cause a corresponding phase delay between a current, induced by the CVB, and a magnetic field in the low conductivity toroid of the same toroid pair, the magnetic field generated by the high conductivity toroid in response to the CVB.

19. The detector of claim 1, wherein the high conductivity toroid is a metal toroid and the low conductivity toroid is a semiconductor toroid.

20. An imaging device comprising an array of electromagnetic radiation detectors and a circuit connected with said array of detectors to receive a signal from each detector, each detector comprising:
a polarization control element (PCE) configured to receive incident radiation and having a substrate with a shape to polarize said incident radiation into a cylindrical vector beam (CVB); and
a rectifying element (RE) configured to receive the CVB and generate the signal representing information of the incident radiation, the RE including at least one toroid pair having a high conductivity toroid and a low conductivity toroid concentric with the high conductivity toroid; wherein each toroid pair, in response to receiving the CVB, creates a Hall voltage used to generate said signal representing information of the incident radiation.

\* \* \* \* \*